Feb. 10, 1931.  R. C. OSGOOD  1,792,115
HOISTING MECHANISM
Original Filed Dec. 18, 1923
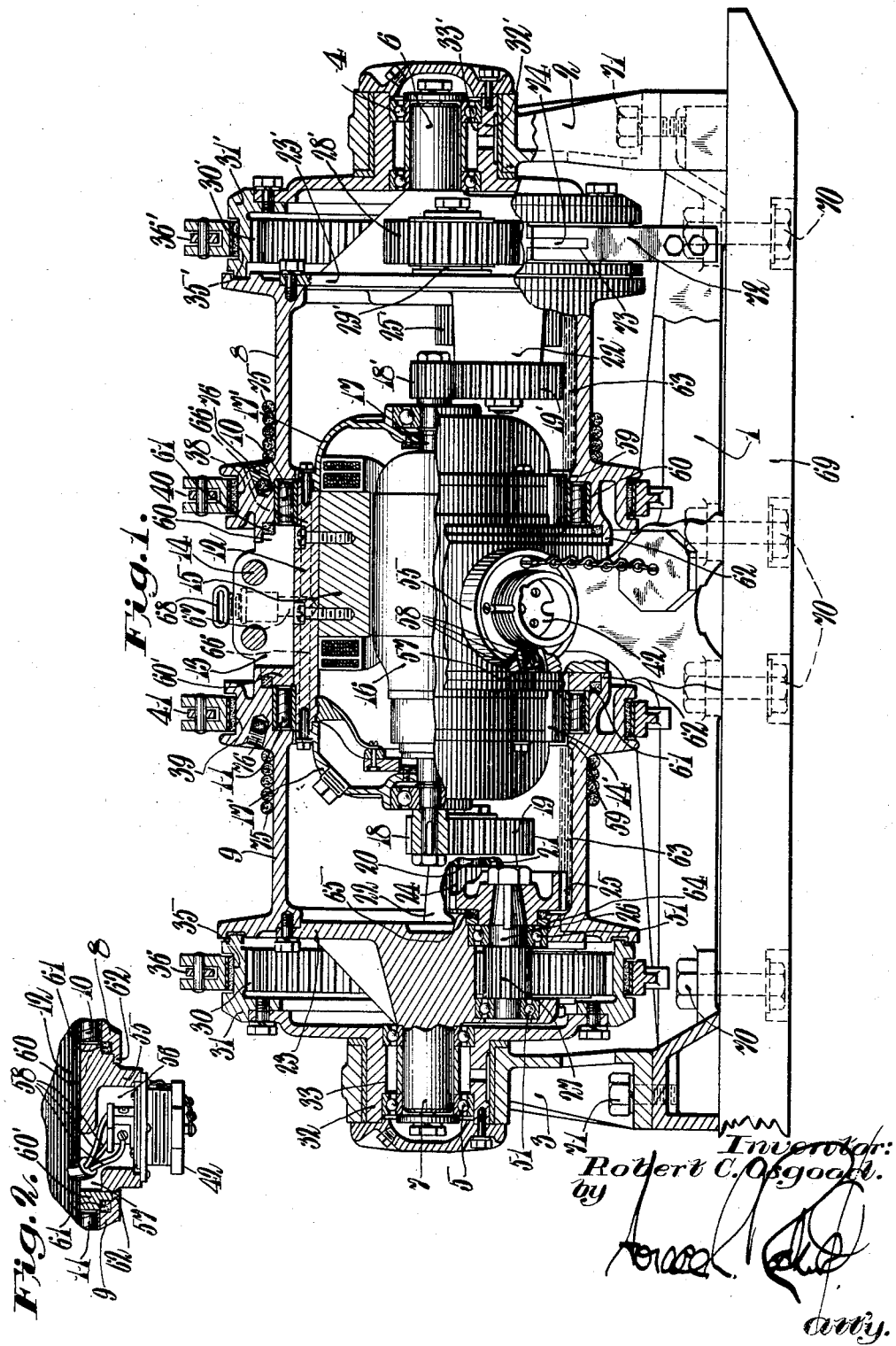
Inventor:
Robert C. Osgood.
by
atty.

Patented Feb. 10, 1931

1,792,115

UNITED STATES PATENT OFFICE

ROBERT C. OSGOOD, OF CLAREMONT, NEW HAMPSHIRE, ASSIGNOR TO SULLIVAN MACHINERY COMPANY, A CORPORATION OF MASSACHUSETTS

HOISTING MECHANISM

Application filed December 18, 1923, Serial No. 681,432. Renewed August 1, 1930.

My invention relates to hoisting mechanisms, and more particularly to portable hoisting mechanisms.

An object of my invention is to provide an improved hoisting mechanism. Another object of my invention is to provide an improved portable hoisting mechanism of the power driven type. A further object of my invention is to provide an improved double drum hoisting mechanism having a single driving motor for the drums thereof. A still further object of my invention is to provide an improved double drum hoisting mechanism especially adapted to cooperate with scraping mechanisms in which different speeds of movement of the ropes may be conveniently employed in the case of empty and loaded scoops. Other objects and advantages of my invention will hereinafter more fully appear.

In the accompanying drawing I have shown for purposes of illustration one form which my invention may assume in practice.

In the drawings,—

Fig. 1 is a central longitudinal section with parts shown in elevation.

Fig. 2 is a partial horizontal transverse section through the plug switch.

In its illustrative form my invention comprises a frame 1 having hangers or standards 2 and 3 disposed at the opposite ends thereof and providing bearings for members hereinafter described, in which, in turn, bearings are arranged at 4 and 5 respectively for the shafts 6 and 7 of drums 8 and 9, said drums at their adjacent ends in the illustrative from of my invention rotating upon roller bearings 10 and 11 carried upon the exterior of the stationary motor casing or housing 12, which casing is supported upon the main frame 1 in a suitable split clamp 13 and rigidly held therein by bolts 14 and a spline connection 14'. The motor is of the electric type, the field poles 15 being rigidly secured to the stationary motor housing and armature 16 rotating coaxially with the drums 8 and 9. The armature 16 has a shaft 17 which projects through closure plates 17' at the opposite ends of the motor, this shaft 17 at opposite ends of the motor having keyed thereon driving pinions numbered, respectively, 18 and 18'.

As with the exception of the fact that the ratio of speed reduction is different, the power transmitting reduction gearing is the same at the opposite ends of the motor, it will be sufficient to describe the gearing at one end thereof, it being understood that corresponding parts at the opposite end are indicated by primed numbers. The pinion 18 meshes with and drives a gear 19 carried upon a shaft 20 journaled in spaced bearings 21 in a projecting bracket 22 formed upon an end closure plate 23 of the drum 9. This bracket projects inwardly from the end closure and laterally to provide a recess or hollow. Supported between the bearings 21 and extending within the hollow of the bracket and fixedly disposed with respect to the shaft 20 is a pinion 24. This pinion meshes with and drives a larger pinion 25 fixed upon a shaft 26 journaled in spaced bearings 51 carried by the head 23, and the shaft 26 at its opposite end carries a pinion 27 disposed between the bearings 51 which drives a gear 28' journaled upon a stud 29' on the outside of the head 23. The gear 28' meshes with an internal gear 30 which is formed upon the internal periphery of a member 31. The latter member is provided with a collar 32 journaled in the standard 3 and forming in its bore 33 a chamber in which the bearings 5 are received. The member 31 is provided with a braking surface 35 with which braking means 36 cooperates. A similar braking means 36' cooperates with a similar member 31' at the opposite end of the hoisting mechanism. Braking means including braking surfaces 38 and 39 are provided respectively on the drums 8 and 9 and brake band means 40 and 41 respectively cooperate with these elements.

From the foregoing description the mode of operation of my invention will be clearly apparent. The motor being supplied with current through the electrical connections 42, the armature 16 will rotate, rotating the shaft 17, and depending upon which of the members 31 and 31' is held stationary by its respective braking mechanism, the drum 8 or the drum 9 will be rotated. By virtue of the fact that the ratio of reduction is smaller in the gearing driven by the pinion 18' than that driven by the pinion 18, the drum 8 will rotate at a lower speed than the drum 9 and, if the ropes wound upon the drums 8 and 9 are connected to a scoop, for example, the drum 8 may be employed to haul in the scoop loaded while the drum 9 will haul back the empty scoop at a more rapid rate. It will be further noted that by allowing the braking mechanisms 36 or 36' to slip somewhat, practically any rate of speed of winding of either of the drums 8 or 9 may be obtained within the limits between no rotation and the maximum speed of rotation with the members 31 or 31' held rigidly, or the drums may be freely turned backwards if the braking mechanisms are entirely released.

In a device of this type which uses gears and bearings, it is highly desirable to arrange the various elements so that oil may be carried within the space where the gears are located and so that the oil will not readily leak out. Also it is important to provide suitable means whereby the motor with the usual electric lead wires which project radially from the motor casing can be assembled within the split clamp 13 and oil or dirt prevented from working into these parts. To accomplish these results a boss 55 cast on the front side of the clamp 13 has a recess 56. A horizontal slot 57 extends from one vertical edge of the clamp to the recess 56. Thus, during assembling the motor is pushed horizontally into the clamp and the lead wires 58 would without the slot 57 engage the side of the clamp and prevent the motor from being centrally located within the clamp. However, the wires 58 are first shoved through the slot and into the recess, then the motor is moved further towards the center, with the result that the wires are disposed within the outer edges of the clamp and fully protected from injury. To provide suitable side guides for the rollers of the bearings 10 and 11, flanges 59 project inwardly from the inner wall of the drums to engage one end of the rollers. The other end of the rollers of bearing 10 engages a stepped flange 60 forming the right hand edge of the clamp. Disposed within the stepped portion of the flange 60 is a packing 61 to prevent oil leakage, it being noted that a small annular portion 62 carried by the drum projects over the flange 60. The flanges 59 perform the additional function of preventing the flow of any foreign material into the rollers along with the oil, thereby insuring increased life of the bearings.

The left hand flange 60' is movably mounted on the motor casing which can be removed to allow clear access to the slot during assembling. After the motor is in position, the flange 60', which is otherwise identical to flange 60, is forced onto the motor casing against the left hand edge of the clamp as shown in Fig. 2. The wires 58 are thereby enclosed in a chamber practically free of oil penetration. To further insure that leakage of the oil 63 within the drums is reduced to a minimum, a washer 64 and packing 65 surround the hub of gears 25 and 25' and the motor casing is also made oil proof. Mounted upon the boss 55 is a standard plug switch 42 to which the wires 58 are connected. To allow oil to be easily supplied to the gears without disassembling any of the hoist parts, conduits 66 extend in both directions to the interior of the drums from a central passage 67 which is normally closed by a removable screw plug 68.

A hoist of this character is sometimes mounted upon a skid or foundation 69, the frame 1 being attached thereto by bolts 70, and to allow the hoist to be disassembled without the necessity of removing the frame 1 from the skid or foundation, the standards 2 and 3 are fixed to the frame 1 by bolts 71 which are removable from the upper side of the frame. More particularly, as a result of this construction I can readily remove the drum structure and other elements without necessitating any change of position of the hoist frame 1 with respect to the skid 69 or any other suitable foundation upon which it might be mounted. For instance, the bolts 71 may be removed, the standard 2 pulled off endwise from the shaft 6, arms 72 being removed to allow the end member 31' to be removed and by the removal of brake band 40 the drum 8 may be readily slid from its bearings 10. Such a construction is highly desirable for its allows practically immediate access to the various inner parts of the mechanism by removing only the most necessary elements. Hence no time is lost either in inspection of the device or repairing the same, in lifting the hoist from its base or removing a great number of bolts. It will of course be obvious that these conditions are true for either the right or left hand drum. Thus, if both drums are removed, the motor will be left in its original position. Here it will also be understood that as in a prior construction, the braking bands of the braking means 36 and 36' are held in position by arms 72 detachably fastened to the base and disposed on each side of the bands, slots 73 being formed in the arms and having disposed therein lugs 74 fixed to the bands. Thus the bands may be readily removed by merely detaching the arms. It is also to be noted that the cable 75 is as usual fixed to the drums by placing the end of the same in an angularly disposed hole in the drum and using a set screw 76 adapted to clamp the same.

This application is a continuation in part of my copending application Ser. No. 614,-116, filed Jan. 22, 1923, and relating to hoisting mechanisms.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A hoisting mechanism comprising a motor having a housing and having lead wires projecting radially from said housing, a standard having a bore longitudinally slidably receiving said motor housing, the periphery of said bore and housing substantially engaging each other during said sliding movement, said standard having a slot extending inwardly from one side thereof to receive said wires upon insertion of said housing in said bore, said standard having also a chamber extending substantially radially and communicating with said slot, an annular ring adapted to abut the side of said standard adjacent said slot, and a drum surrounding said housing and journaled on the periphery of the same and having portions overlying said ring.

2. A hoisting mechanism comprising an electric motor having a housing and lead wires projecting radially therefrom, a supporting bracket adapted to slidably receive said motor and having a slot therein to receive said wires, a drum, means for journaling said drum on said housing, and means for preventing access of foreign matter to said journal from the outside including means for covering said slot.

3. A hoisting mechanism comprising a motor having a housing and lead wires extending radially therefrom, a bracket adapted to slidably receive said housing and having a slot through which said wires are adapted to radially project, a drum rotatably supported by said motor, motor actuated gearing disposed in said drum for driving the same, and means providing a substantially oil tight connection at one end of said drum including means for covering said slot.

4. In a hoisting mechanism, a motor having a stationary housing, a rotatable hollow winding drum surrounding and journaled at one end on said housing, the other end of said drum being closed whereby a lubricant reservoir is formed in said drum, operative driving connections between said drum and motor, and means for supplying oil within said drum, said drum being formed adjacent said journal with an annular projection from its wall to act as a sediment retainer.

5. In a hoisting mechanism, a motor having a stationary housing, a rotatable hollow winding drum surrounding and journaled at one end on said housing, the other end of said drum being closed whereby a lubricant reservoir is formed in said drum, means for driving said drum by said motor including transmission gearing disposed in said drum, and means for supplying oil within said drum for lubricating said gearing, said drum being formed adjacent said journal with an annular projection from its wall adapted to act as a sediment retainer.

6. A hoisting mechanism comprising a motor having a stationary casing, a winding drum having at one end a portion normally surrounding and rotatably supported upon said motor casing, means separate from said motor casing for supporting the other end of said drum, means for supporting said motor casing releasable to permit sliding of the latter through said supporting means out of supporting relation to the drum, and means positioned to cooperate with the end of said drum which is normally rotatably supported upon said motor casing to maintain said drum, upon removal of said motor casing, in substantially its normal position.

7. A hoisting mechanism comprising a motor having a housing, a standard having a bore longitudinally slidably receiving said motor housing, the periphery of said bore and housing substantially engaging each other during said sliding movement, and a drum surrounding said housing and journaled on the periphery of the same, said standard having a portion substantially coaxial with the drum and said drum having a portion overlying said portion of said standard and adapted to support said drum upon withdrawal of said motor and discontinuation of the journaling of the drum thereon.

8. A hoisting mechanism comprising a motor having a housing, a standard having a bore longitudinally slidably receiving said motor housing, the periphery of said bore and housing substantially engaging each other during said sliding movement, and a drum surrounding said housing and journaled on the periphery of the same, said standard having a portion substantially coaxial with the drum and said drum having a portion concentric with said portion of said standard and adapted to cooperate with said portion to support said drum upon withdrawal of said motor and discontinuation of the journaling of the drum thereon.

9. A hoisting mechanism comprising a motor having a stationary casing providing a cylindrical bearing surface on its periphery, means surrounding said casing to removably support the same, a winding drum having at one end an internal bearing surface surrounding and journaled directly on said bearing surface on the periphery of said casing, and means separate from said casing for supporting the other end of said drum, said motor casing being adapted upon release from the support to slide through said support while said drum is retained substantially in its normal supported position, there being an annular flange on the drum surrounding and in close proximity to the outer surface of the casing supporting means, thereby permitting supporting relation between said drum and supporting means when said motor casing is removed.

10. In a hoisting mechanism, a motor having a casing, a power shaft, and a pinion carried by said power shaft, a drum rotatably supported at one end of said motor, said drum comprising an end plate provided with an inwardly projecting bracket, driving connections between said shaft and drum including a pair of coaxial gears secured together of which one meshes with said pinion, and a second pair of coaxial gears secured together of which one meshes with the remaining gear of the first pair, a said first mentioned pair of gears being supported by said bracket, said bracket being provided with bearings disposed to either side of said remaining gear, and said second mentioned pair of gears being supported by said end plate offset from the drum axis and with a gear on each side of said plate.

11. In a hoisting mechanism, a motor having a casing, a power shaft, and a pinion carried by said power shaft, a drum surrounding and rotatably supported on one end of said casing, said drum comprising an end plate provided with an inwardly projecting bracket, driving connections between said shaft and drum including a pair of coaxial gears secured together of which one meshes with said pinion, and a second pair of coaxial gears secured together of which one meshes with the remaining gear of the first pair, said first mentioned pair of gears being supported by said bracket, said bracket being provided with bearings disposed to either side of said remaining gear, and said second mentioned pair of gears being supported by said end plate offset from the drum axis and with a gear on each side of said plate.

12. A hoisting mechanism comprising a drum, driving means therefor, and means for connecting the same in operative driving relation with said drum comprising a gear, said drum including a removable end plate supporting said drum, and said removable end plate being provided with a hollow bracket projecting from said plate and having said gear disposed within its hollow and rotatably supporting said gear, said bracket providing a bearing for said gear at the side of the latter remote from said end plate.

13. In a hoisting mechanism, a drum, driving means therefor extending within said drum, said drum having a removable end plate provided with an inwardly projecting bracket, and reduction gearing operatively connecting said driving means to said drum including a pair of coaxial gears secured together and rotatably supported by said bracket, the latter being provided with longitudinally spaced bearings between which is disposed one of said gears.

14. In a hoisting mechanism, a drum, a motor having a casing and a driving pinion, said casing and pinion both extending within said drum, said drum including a removable end plate provided with an inwardly projecting bracket, and reduction gearing operatively connecting said motor to said drum including a pair of coaxial gears secured together and rotatably supported by said bracket, the latter being provided with longitudinally spaced bearings, one of said coaxial gears being disposed between said bearings and meshing with said driving pinion.

15. A hoisting mechanism comprising a drum, a motor having a stationary casing and a central power shaft carrying a pinion, said casing and shaft both extending within said drum, driving connections between said motor and drum including a plurality of sets of coaxial gears and means carried by said drum for supporting said sets of gears, a gear in each set meshing with each other and the remaining gear of one set meshing with said pinion, and means operatively connected to the remaining gear of the other set to drive said drum, said latter means including a gear adapted to be held stationary during driving of said drum or be freely rotatable when the drum is idle.

In testimony whereof I affix my signature.

ROBERT C. OSGOOD.